United States Patent
Mujtaba et al.

(10) Patent No.: US 8,958,760 B2
(45) Date of Patent: Feb. 17, 2015

(54) DYNAMIC TRANSMIT CONFIGURATIONS IN DEVICES WITH MULTIPLE ANTENNAS

(75) Inventors: Syed A. Mujtaba, Santa Clara, CA (US); Weiping Dou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 13/346,419

(22) Filed: Jan. 9, 2012

(65) Prior Publication Data
US 2012/0184228 A1 Jul. 19, 2012

Related U.S. Application Data

(60) Provisional application No. 61/433,160, filed on Jan. 14, 2011.

(51) Int. Cl.
*H04B 1/04* (2006.01)
*H04B 7/06* (2006.01)

(52) U.S. Cl.
CPC .............. *H04B 1/3838* (2013.01); *H04B 1/04* (2013.01); *H04B 7/0608* (2013.01); *H04B 7/0689* (2013.01)
USPC ........... 455/103; 455/101; 455/105; 455/104; 455/575.7

(58) Field of Classification Search
CPC . H04W 52/52; H04W 88/06; H04W 52/0229; H04W 72/1215; H04W 72/1242; H04W 24/00; H04W 52/36
USPC ....................................................... 455/103
See application file for complete search history.

(56) References Cited

U.S. PATENT DOCUMENTS

| | | | |
|---|---|---|---|
| 7,403,508 B1 | 7/2008 | Miao | |
| 7,512,083 B2 * | 3/2009 | Li | 370/269 |
| 8,095,083 B2 | 1/2012 | Raghuraman | |
| 2006/0121934 A1 | 6/2006 | Jeong et al. | |
| 2008/0165758 A1 | 7/2008 | Kato et al. | |
| 2010/0248799 A1 * | 9/2010 | Lum et al. | 455/575.7 |
| 2010/0310005 A1 * | 12/2010 | Takagi et al. | 375/295 |
| 2001/0293044 | 12/2011 | Kent et al. | |

OTHER PUBLICATIONS

Syed A. Mujtaba, U.S. Appl. No. 13/195,732, filed Aug. 1, 2011.

* cited by examiner

*Primary Examiner* — Ajibola Akinyemi
(74) *Attorney, Agent, or Firm* — Treyz Law Group; Jason Tsai; Michael H. Lyons

(57) ABSTRACT

Electronic devices may have multiple wireless integrated circuits such as a pair of baseband processor integrated circuits and may have multiple antennas such as a pair of antennas. An electronic device may be operated in different modes depending on the operating environment of the electronic device. When both antennas are unblocked, both baseband processors and both antennas may be used in transmitting signals. When one antenna is not available, the device may be operated in a mode in which the available antenna is used and both baseband processors are used or in a mode in which the available antenna is used and only one of the baseband processors is used. Operating mode decisions may be made so as to minimize the potential for intermodulation distortion and absorbed radiation.

22 Claims, 7 Drawing Sheets

DYNAMIC TRANSMIT CONFIGURATIONS IN DEVICES WITH MULTIPLE ANTENNAS

This application claims the benefit of provisional patent application No. 61/433,160, filed Jan. 14, 2011, which is hereby incorporated by reference herein in its entirety.

BACKGROUND

This relates to electronic devices such as cellular telephones and, more particularly, to methods for transmitting wireless traffic across antenna arrays.

Electronic devices such as cellular telephones contain wireless circuitry such as radio-frequency transceiver integrated circuits and associated wireless baseband circuitry. These wireless circuits may be used in handling wireless voice and data communications.

In some cellular telephones, multiple antennas are available. Configurable circuitry in this type of cellular telephone may be used to choose which of the antennas should receive incoming wireless traffic based on factors such as the measured quality of received signals on each of the antennas.

Challenges can arise, however, in determining how to optimize wireless performance when transmitting signals though this type of antenna configuration. If care is not taken, voice calls may be dropped or data transmission operations may be disrupted.

It would therefore be desirable to provide improved ways in which to support wireless communications in electronic devices.

SUMMARY

An electronic device may transmit voice and data using multiple antennas. For example, a device may have first and second antennas that can be selectively connected to a voice source and a data source using switching circuitry. The mode in which the device transmits signals may be adjusted dynamically during operation. Priority may be given to voice signals. If the device is operating at a large distance from a cell tower in which there is insufficient transmit power margin available to accommodate both data and voice, the device may use the best available antenna to transmit voice only (a 1×1 operating mode). If the device is operating close to a cell tower and both antennas are available, the device may transmit voice through one antenna and data through the other antenna (a 2×2 operating mode). If the device is operating close to a cell tower and only one antenna is available, the device may operate in a mode in which the available antenna is shared by the voice and data sources (a 2×1 operating mode).

Further features of the present invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in multiple wireless communications bands. The wireless communications circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
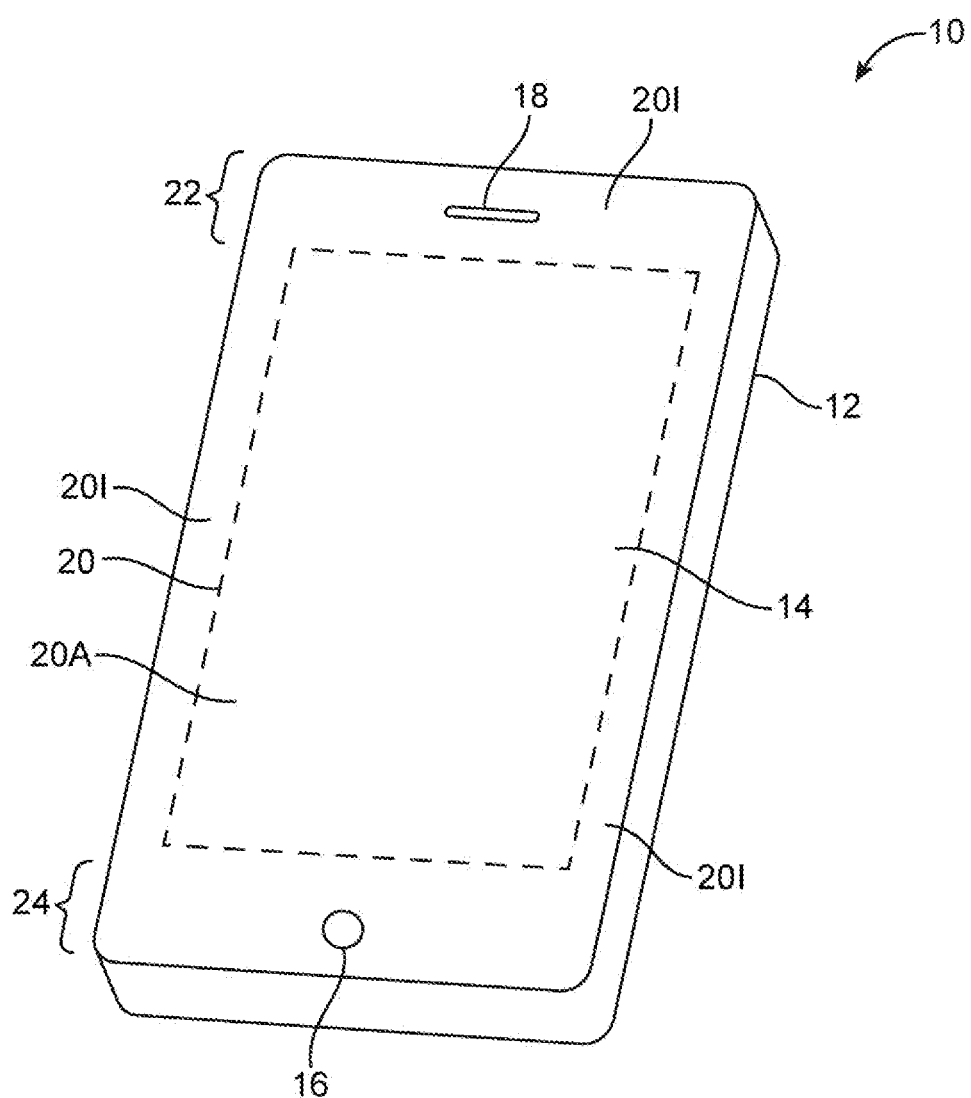
FIG. 1 is a perspective view of an illustrative electronic device with wireless communications circuitry in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a cellular telephone, a media player, a wrist-watch device, pendant device, headphone device, earpiece device, or other wearable or miniature device, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover either a first subset of bands or a second subset of bands and thereby cover all bands of interest.

Figure 2:
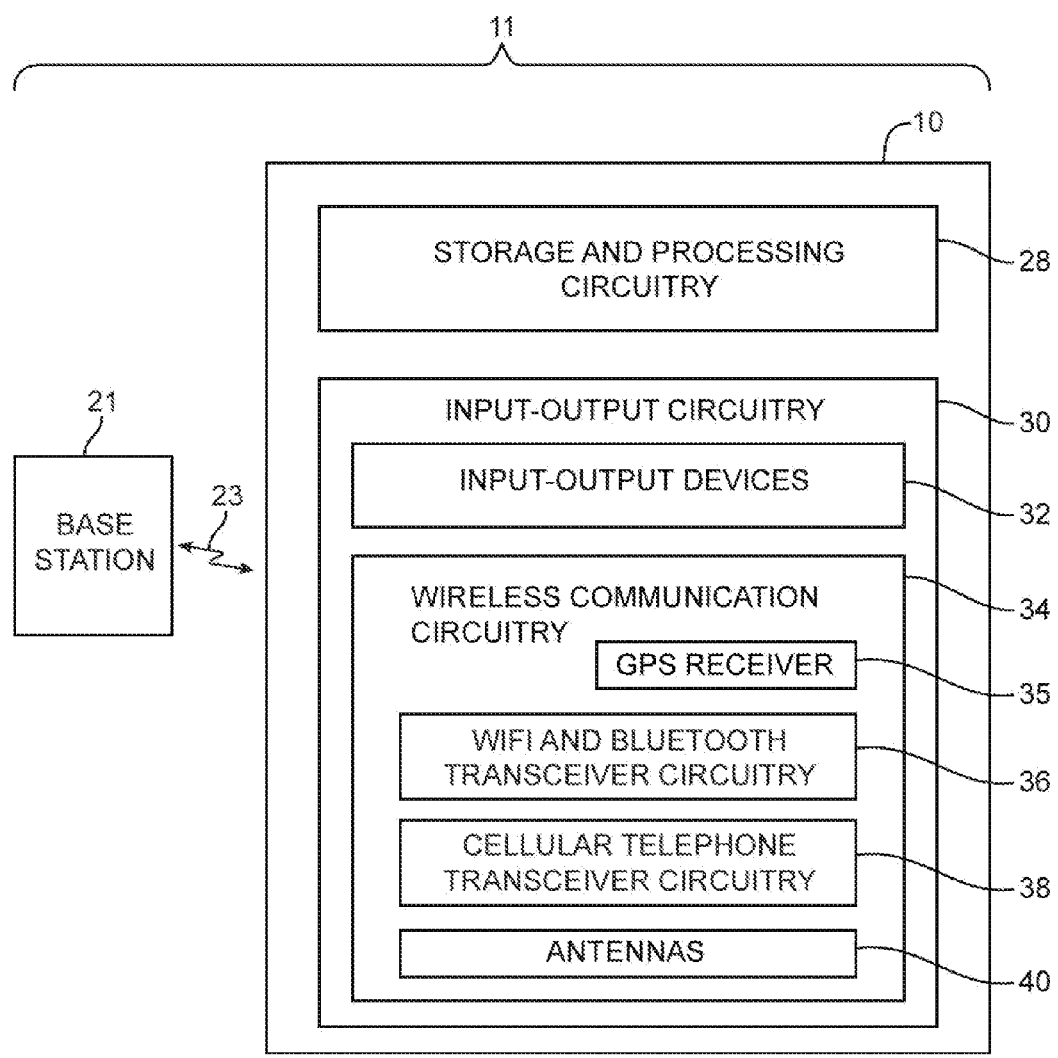
FIG. 2 is a schematic diagram of a wireless network including a base station and an illustrative electronic device with wireless communications circuitry in accordance with an embodiment of the present invention.

A schematic diagram of a system in which electronic device 10 may operate is shown in FIG. 2. As shown in FIG. 2, system 11 may include wireless network equipment such as base station 21 (sometimes referred to as a base transceiver station). Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, the "4G" Long Term Evolution (LTE) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received traffic channel signals, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR)

information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

In some embodiments of the present invention, device 10 may be described that supports the circuit switching technology and packet switching technology. Circuit switching involves establishing a dedicated/exclusive communications channel through a network before any user data is transmitted. A channel established using circuit switching guarantees the full bandwidth of the channel and remains connected for the entire duration of the session (e.g., the channel remains unavailable to other users until the session is terminated and the channel is released).

Traditionally, the Public Switched Telephone Network (PTSN) is implemented using circuit switching. Device 10 may include a baseband processing circuit configured to support circuit switching technologies such as the "3G" CDMA2000 1xRTT (sometimes referred to herein as "1x") cellular telephone communications technology, the "3G" Universal Mobile Telecommunications System (UMTS) cellular telephone communications technology, and the "2G" GSM cellular telephone communications technology (as examples). The baseband processing circuit that is being operated to support circuit switching cellular telephone communications protocols may therefore sometimes be referred to as a "voice" baseband processor integrated circuit.

Packet switching involves organizing data to be transmitted into groups referred to as packets in accordance with the Internet Protocol (IP). Each packet may contain the IP address of the source node, the IP address of the destination node, user data (often referred to as data load or payload), and other control information. Unlike circuit switching, packet switching shares available network resources among multiple users. Each packet being sent may be routed independently to the desired destination, and as a result, each packet may experience varying packet transfer delays. Packets arriving at the destination node may be buffered until all the packets have arrived. Once a sufficient number of packets have reached their destination, the packets can be reassembled to recover the original transmitted data at the source.

The Internet and most local area networks rely on packet switching. Device 10 may include a baseband processing circuit configured to support packet switching technologies such as the "3G" Evolution-Data Optimized (sometimes referred to herein as "EV-DO") radio access technology, the "4G" LTE radio access technology, the "3G" High Speed Packet Access (HSPA) radio access technology, the "2G" Enhanced Data Rates for GSM Evolution (EDGE) radio access technology, and the "2G" General Packet Radio Service (GPRS) radio access technology (as examples). The baseband processing circuit that is being operated to support packet switching radio access technologies may therefore sometimes be referred to as a "data" baseband processor integrated circuit.

Figure 3:
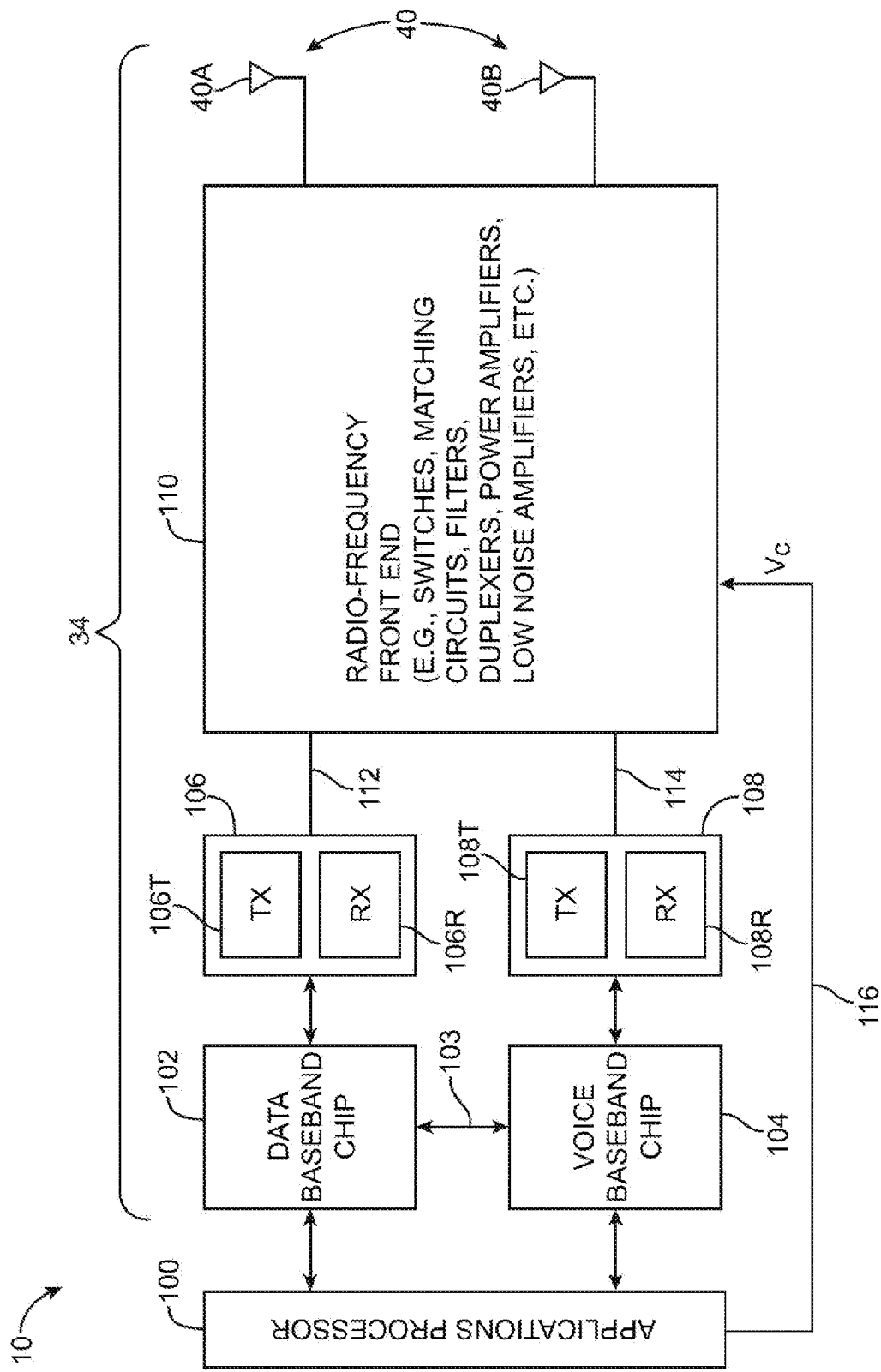
FIG. 3 is a diagram of illustrative wireless communications circuitry that may be used in an electronic device having multiple antennas in accordance with an embodiment of the present invention.

In one suitable arrangement of the present invention, device 10 may include a first baseband processing circuit 102 that is used exclusively (or primarily) for handling packet switched "data" traffic and a second baseband processing circuit 104 that is used exclusively (or primarily) for handling circuit switched "voice" traffic (see, e.g., FIG. 3). First and second baseband processing circuits 102 and 104 may be separate integrated circuits that are mounted on a printed circuit board secured within housing 12 of device 10. As an example, first baseband processor 102 may include memory and control circuitry for implementing the LTE protocol stack to handle LTE functions while the second baseband processor 104 may include memory and control circuitry for implementing the UMTS protocol stack to handle UMTS functions. The use of device 10 that supports two radio access technologies such as LTE and UMTS radio access technologies is merely illustrative. If desired, processors 102 and 104 and additional baseband processing circuits within device 10 may be configured to support other radio access technologies.

Baseband processors 102 and 104 may be coupled to a common control circuit such as applications processor 100.

Applications processor 100 may be configured to store and execute control code for implementing control algorithms. Baseband processors 102 and 104 may be part of wireless circuitry 34, whereas applications processor 100 may be part of storage and processing circuitry 28. Baseband processors 102 and 104 may provide data traffic and voice traffic to applications processor 100 via respective paths. In addition to the transmitted user data, processors 102 and 104 may also provide applications processor 100 with information on whether responses (acknowledgements) are being received from a cellular telephone tower corresponding to requests from device 10, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by applications processor 100 and/or processors 102 and 104 and, in response, baseband processors 102 and 104 (or, if desired, applications processor 100) may issue control commands for controlling wireless circuitry 34. For example, baseband processors 102 and 104 may issue control signals Vc over path 116 to selectively switch desired antennas in and out of use.

Wireless circuitry 34 may include radio-frequency transceiver circuitry such as radio-frequency transceiver circuitry (e.g., transceiver circuits 106 and 108) and radio-frequency front-end circuitry 62. Some transceivers may include both a transmitter and a receiver. If desired, one or more transceivers may be provided with receiver circuitry, but no transmitter circuitry (e.g., to use in implementing receive diversity schemes). As shown in the illustrative configuration of FIG. 3, transceiver 106 that is associated with data baseband processor 102 may include a transmitter such as transmitter 106T and a receiver such as receiver 106R, whereas transceiver 108 that is associated with voice baseband processor 104 may include a transmitter such as transmitter 108T and a receiver such as receiver 108R.

Wireless communications circuitry 34 may further include radio-frequency front end circuitry 110 coupled between the transceiver circuitry and antennas 40. In particular, transceivers 106 and 108 may be coupled to front end circuitry 110 via paths 112 and 114, respectively. Radio-frequency front end 110 may be used to convey the radio-frequency signals that are produced by the radio-frequency transceiver circuitry to antennas 40. Radio-frequency front end 110 may include radio-frequency switches, impedance matching circuits, band-pass filters, duplexers, power amplifiers, low noise amplifiers, and other circuitry for forming an interface between antennas 40 and transceivers 106 and 108. Antennas 40 may include at least first antenna 40A and second antenna 40B. First antenna 40A may be formed in region 24 of device 10, whereas second antenna 40B may be formed in region 22 of device 10. Antenna 40A may serve as the default active antenna and may be switched into use more often than antenna 40B. Antenna 40A may therefore sometimes be referred to as the primary antenna while antenna 40B may be referred to as the secondary antenna. If desired, antennas 40 may include more than two antennas, more than five antennas, etc.

Incoming radio-frequency signals that are received by antennas 40 may be provided to baseband processors 102 and 104 via radio-frequency front end 110, paths such as paths 112 and 114, and receiver circuitry in transceivers 106 and 108. Path 112 may, for example, be used in handling signals associated with transceiver 106, whereas path 114 may be used in handling signals associated with transceiver 108. Baseband processors 102 and 104 may be used to convert received signals into digital data that is provided to applications processor 100. Baseband processors 102 and 104 may also extract information from received signals that is indicative of signal quality for the channel to which the associated transceivers are currently tuned.

Radio-frequency front end 110 may include switching circuitry. The switching circuitry may be configured by control signals Vc received from applications processor 100 (e.g., control signals from storage and processing circuitry 28 via path 116). If desired, the state of radio-frequency front end 110 may also be controlled using control signals generated from at least one of baseband processors 102 and 104.

As an example, the switching circuitry in front end 110 may be capable of coupling transceiver 106 to antenna 40B while coupling transceiver 108 to antenna 40A so that each of baseband processors 102 and 104 is transmitting/receiving radio-frequency signals via a respective dedicated antenna (e.g., wireless circuitry 34 may be placed in dual antenna mode). As another example, the switching circuitry may be capable of switching one antenna into use (referred to as a currently active antenna) while switching the other antenna out of use (referred to as a currently inactive antenna). In this scenario, the currently active antenna may be coupled to either transceiver 106 for handling data traffic or transceiver 108 for handling voice traffic. As another example, the switching circuitry may be capable of coupling both antennas to a selected one of transceivers 106 and 108 for implementing receive diversity (e.g., both antennas 40 may feed received signals to the receiver in the selected transceiver). As another example, the switching circuitry may be capable of coupling both transceivers 106 and 108 to one active antenna so that transmit signals may be radiated using a common antenna.

If desired, antenna selection may be made by selectively activating and deactivating transceivers without using a switch in front end 110. For example, if it is desired to use antenna 40A but not antenna 40B, transceiver 108 (which may be coupled to antenna 40A through circuitry 110) may be activated and transceiver 106 (which may be coupled to antenna 40B through circuitry 110) may be deactivated. If it is desired to use antenna 40B but not antenna 40A, applications processor 100 may activate transceiver 106 and deactivate transceiver 108. Combinations of these approaches may also be used to select which antennas are being used to transmit and/or receive signals. When it is desired to receive incoming signals such as paging signals using both antennas, transceiver 106 and transceiver 108 may be simultaneously activated to place device 10 in a dual antenna mode. The radio configuration of FIG. 3 is merely illustrative and is not intended to limit the scope of the present invention. If desired wireless circuitry 34 may include any number of baseband processing integrated circuits and associated transceivers, any number of antennas, and any suitable circuitry for interfacing the antennas and the transceivers.

Embodiments of the present invention relate to different ways of transmitting voice and data signals using antennas 40 on a device 10. Antenna 40A may, for example, exhibit a maximum free-space total radiated power (e.g., a measurement reflective of antenna efficiency) greater than that of antenna 40B. Consider a scenario in which device 10 is used to simultaneously maintain a voice call and a data session (i.e., data baseband processor 102 and voice baseband processor 104 both needs to transmit radio-frequency signals via at least one of antennas 40). In this scenario, primary antenna 40A may be used to handle the voice traffic while secondary antenna 40B may be used to handle the data traffic (e.g., voice traffic may have priority over data traffic and may therefore be transmitted using the antenna with greater efficiency).

The performance of antenna 40A may, however, be degraded when a user of device 10 holds device 10 in a certain manner during wireless transmission. For example, the user gripping lower end 24 of housing 12 during a voice call may substantially attenuate the output power of lower antenna 40A. Device 10 may be capable of detecting such attenuation and may reconfigure radio-frequency front end 110 to switch antenna 40A out of use. Signals generated using voice baseband processor 104 may be rerouted to antenna 40B for transmitting. Operations associated with data baseband processor 102 may continue using remaining active antenna 40B or may be temporarily put on hold for at least the duration of the voice call.

Figure 4:
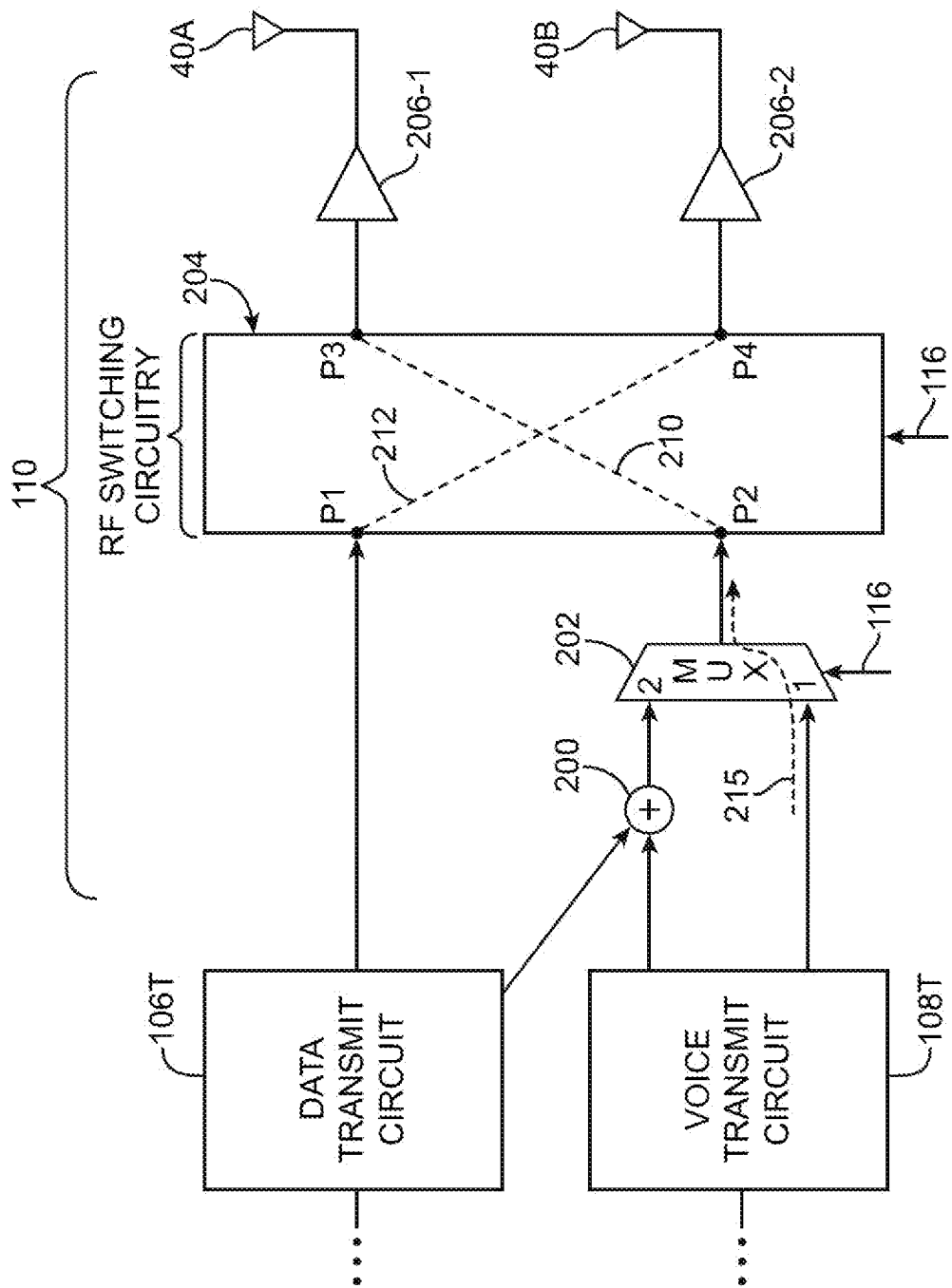
FIG. 4 is a diagram illustrating a transmit mode in which first and second transceiver circuits are each coupled to a respective one of the antennas in accordance with an embodiment of the present invention.

In one suitable arrangement of the present invention, device 10 may be placed in a first transmit mode (mode 2×2) in which each of the baseband processors transmits signals using a respective one of antennas 40 (see, e.g., FIG. 4). FIG. 4 shows exemplary wireless circuitry in the transmit path between antennas 40 and the transceivers. Receive circuitry is not shown for clarity. As shown in FIG. 4, front end 110 may include radio-frequency switching circuitry such as radio-frequency switching circuitry 204, power amplifying circuitry such as power amplifiers 206-1 and 206-2, a radio-frequency combiner such as combiner 200, and multiplexing circuit 202.

Switching circuitry 204 may be a crossover (double-pole-double-throw) switch. Switch 204 may have a first port P1 that is coupled to data transmitter 106T, a second port P2 that is coupled to voice transmitter 108T, a third port P3 that is coupled to antenna 40A via power amplifier 206-1, and a fourth port P4 that is coupled to antenna 40B via power amplifier 206-2. The state of switch 204 may be controlled by control signals received on path 116 from applications processor (sometimes referred to as control circuitry) 100.

In particular, data transmitter 106T may have a first output that is coupled to port P1 and a second output that is coupled to a first input of combiner 200. Voice transmitter 108T may have a first output and a second output that is coupled to a second input of combiner 200. Radio-frequency combiner 200 may serve to combine the two radio-frequency signals received at its inputs and present the combined version of the input signals at its output. Multiplexer 202 may have a first input that is coupled to the first output of voice transmitter 108T, a second input that is coupled to the output of combiner 200, an output that is coupled to port P2, and a control input that receives controls signals from control circuitry 100 via path 116. These control signals may configure multiplexer 202 to route radio-frequency signals from a selected one of its inputs to its output.

In the 2×2 mode, multiplexer 202 may be configured to route radio-frequency signals from its first input to its output (e.g., the voice signals generated at it output of voice transmitter 108T may be passed directly to port P2 as indicated by dotted path 215). In this mode, switch 204 may be configured to couple P1 to a selected one of the antennas and to couple P2 to the other antenna. As an example, switch 204 may be configured to couple port P1 to P4 (e.g., to couple data transmitter 106T to antenna 40B, as shown by dotted line 212) and to couple port P2 to P3 (e.g., to couple voice transmitter 108T to antenna 40A, as shown by dotted line 210). As another example, switch 204 may be configured to couple port P1 to P3 (e.g., to couple data transmitter 106T to antenna 40A) and to couple port P2 to P4 (e.g., to couple voice transmitter 108T to antenna 40B).

Antenna 40A may not always exhibit better transmit performance than antenna 40B. As described previously, device 10 may be capable of obtaining signal quality measurements such as bit error rate measurements, RSSI measurements, RSCP measurements, SINR and SNR measurements, channel quality measurements based on signal quality data, and other radio-frequency measurements. This information can be used to determine to which one of the multiple antennas each of the baseband processors is coupled. For example, in a data priority scheme (i.e., a scheme in which data traffic is given higher priority over voice traffic), data transmitter 106T may be coupled to the antenna exhibiting higher performance levels while voice transmitter 108T is coupled to the antenna exhibiting lower performance levels. In a voice priority scheme (i.e., a scheme in which voice traffic is given higher priority over data traffic), voice transmitter 108T may be coupled to the antenna exhibiting greater signal strength while data transmitter 106T is coupled to the antenna exhibiter lesser signal strength.

In the 2×2 transmit mode, at least one of transmitters 106T and 108T may be momentarily throttled to help reduce wireless interference. For example, consider a scenario in which data baseband processor 102 is transmitting uplink signals in LTE band 15 at 1900 MHz while voice baseband processor 104 is transmitting uplink signals in the UMTS Personal Communications Service (PCS) band at 1850 MHz. Ideally, the transmit circuitry (e.g., the power amplifiers, switches, duplexers, and other front end circuitry) associated with the data and voice baseband processors is perfectly linear. In practice, however, the transmitter circuits exhibit nonlinearities, which can create undesired spurious emissions at sideband frequencies that are relatively close to the fundamental operating frequencies. This phenomenon in which spurious signals are generated at frequencies other than at harmonic frequencies is sometimes referred to as intermodulation distortion. In the above scenario, third order intermodulation distortion (IMD3) signals may be generated at 1800 MHz (i.e., 2*1850 minus 1900), at 1950 MHz (i.e., 2*1900 minus 1850), and at other intermodulation frequencies (as an example). Sideband signals generated in this way contribute to adjacent channel leakage, which can result in adjacent channel interference, a reduction in dynamic range, increased spectrum usage, and other unwanted effects.

In scenarios where the intermodulation signals are unacceptably noisy, at least one of the baseband processors may be temporarily placed in idle mode to eliminate intermodulation distortion. For example, if the IMD3 spurious signals exceed a predetermined level, data baseband processor 102 may be temporarily throttled until voice baseband processor 104 is no longer transmitting any voice traffic (in a voice transmit priority scheme). If desired, voice baseband processor 104 may be temporarily throttled until data baseband processor 102 is no longer transmitting any data traffic (in a data transmit priority scheme).

The example of FIG. 4 is merely illustrative and is not intended to limit the scope of the present invention. In general, device 10 may have any number of baseband processing integrated circuits that can transmit in parallel radio-frequency uplink signals using any number of antennas, where at least one of the multiple baseband processing integrated circuits may be throttled during instances in which intermodulation distortion is creating exceedingly high adjacent channel leakage levels.

Figure 5:
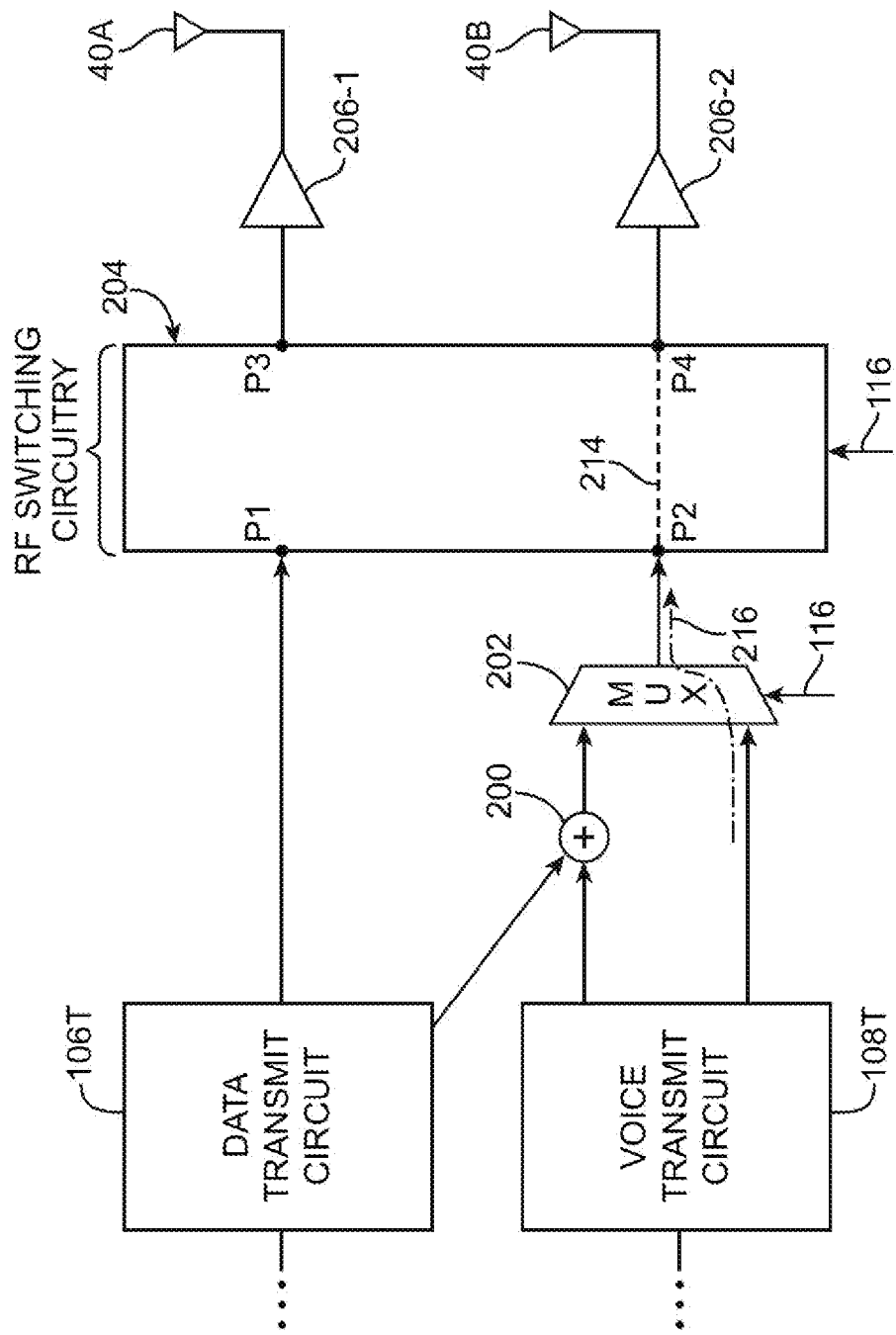
FIG. 5 is a diagram illustrating a transmit mode in which only one of the antennas is switched into use and in which that antenna is coupled to a selected one of two transceiver circuits in accordance with an embodiment of the present invention.

In another suitable arrangement of the present invention, device 10 may be placed in a second transmit mode (mode 1×1) in which only one antenna is active and in which that active antenna is being used to serve only one of the baseband processors (see, e.g., FIG. 5). In the 1×1 mode, multiplexer 202 may be configured to route radio-frequency signals from its first input to its output (e.g., voice signals may be passed directly to port P2 as indicated by dotted path 216). As shown in FIG. 5, switch 204 may be configured to couple P2 to antenna 40B if signals received at antenna 40A are severely attenuated (e.g., if receive signal strength is reduced from nominal levels by at least 20 dBm), as shown by dotted line 214. When antenna 40B is transmitting voice traffic, data transmitter 106T may be temporarily placed in idle mode (e.g., data transmitter 106T may be decoupled from antennas 40).

As another example, data transmitter 106T may transmit data signals using only antenna 40A while voice transmitter 108T is placed in idle mode (when device 10 is not being used in a voice call). In particular, switch 204 may be configured to couple port P1 to P3 while port P2 is decoupled from antennas 40. If the reception at antenna 40A falls below satisfactory levels, data transmitter 106T may rely on antenna 40B to handle data traffic (e.g., switch 204 may be reconfigured to couple port P1 to P4). In general, it may be desirable to switch the antenna that is currently exhibiting higher transmit efficiency into use to support the active baseband processor during the second transmit mode. Device 10 operating in the 1×1 mode may experience minimal interference and out-of-band emissions, because only one of the two baseband processing circuits is transmitting radio-frequency signals at any given point during the 1×1 operating mode, thereby eliminating any intermodulation distortion.

Figure 6:
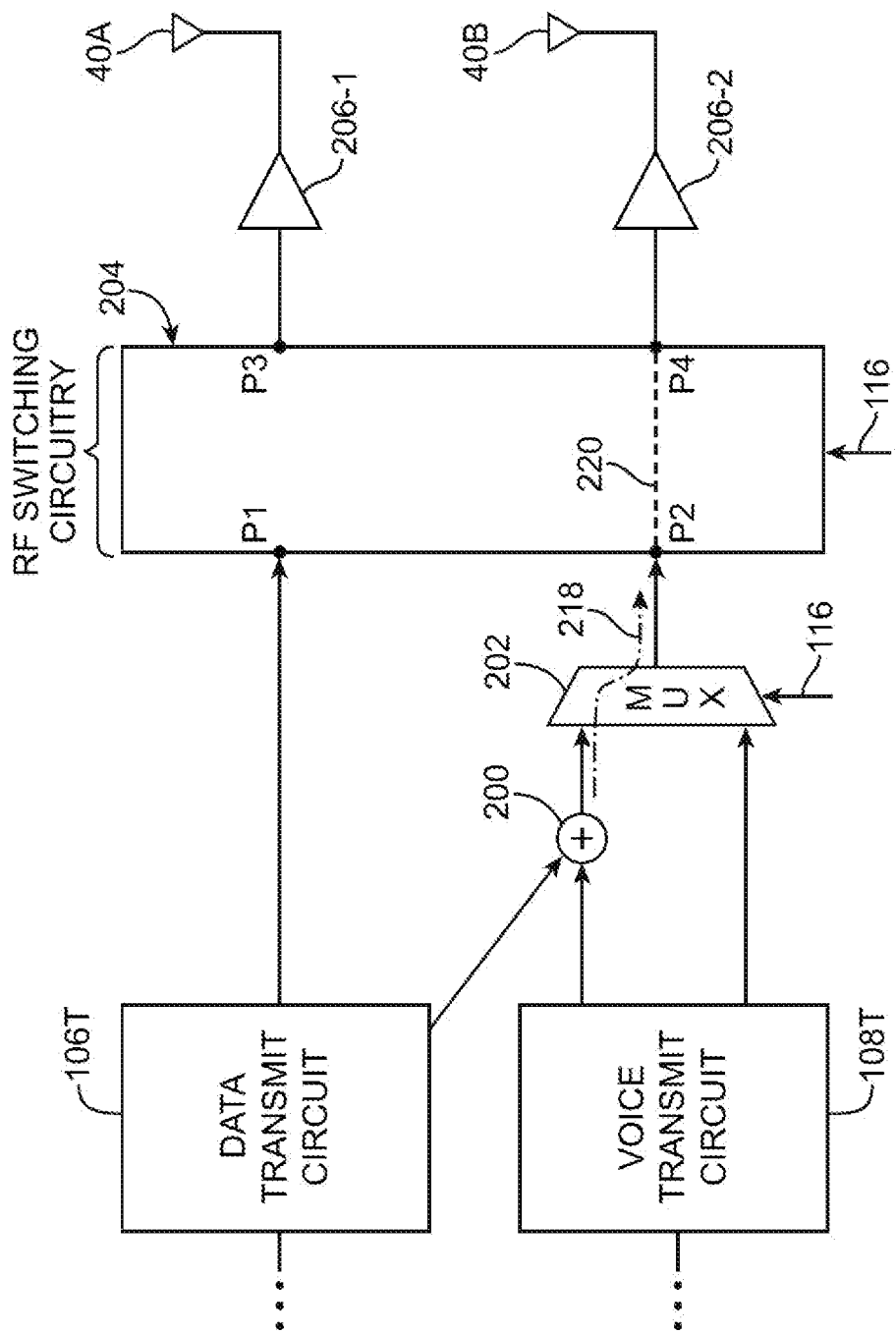
FIG. 6 is a diagram illustrating a transmit mode in which only one of the antennas is switched into use and in which that antenna is shared between two transceiver circuits in accordance with an embodiment of the present invention.

In another suitable arrangement of the present invention, device 10 may be placed in a third transmit mode (mode 2×1) in which only one antenna is active and in which that active antenna is being shared between the multiple baseband processors (see, e.g., FIG. 6). In the 2×1 mode, multiplexer 202 may be configured to route radio-frequency signals from its second input to its output (e.g., voice and data signals may be passed to port P2 as indicated by dotted path 218). As shown in FIG. 5, switch 204 may be configured to couple P2 to antenna 40B if signals received at antenna 40A are severely attenuated, as shown by dotted line 220. In the 2×1 transmit mode, both data transmitter 106T and voice transmitter 108T may be transmitting at relatively lower power levels because the maximum total radiated power of antenna 40B is limited (i.e., a first portion of the maximum TRP is being used by voice transmitter 108T, whereas a second portion of the maximum TRP is being used by data transmitter 106T).

Device 10 operating in the 2×1 transmit mode may also be configured to monitor the sidebands for intermodulation distortion. In scenarios in which the third order intermodulation distortion spurious signals (sometimes referred to as IMD3 products/terms) exceed acceptable threshold levels, at least one of the baseband processors may be forced to transmit at further reduced output power levels or may be throttled. Intermodulation distortion constraints associated with the 2×1 transmit mode are generally more stringent than the IMD requirements associated with the 2×2 transmit mode because using a single antenna to transmit in multiple frequency bands is inherently more prone to adjacent channel leakage compared to using multiple antennas to transmit in respective frequency bands.

Figure 7:
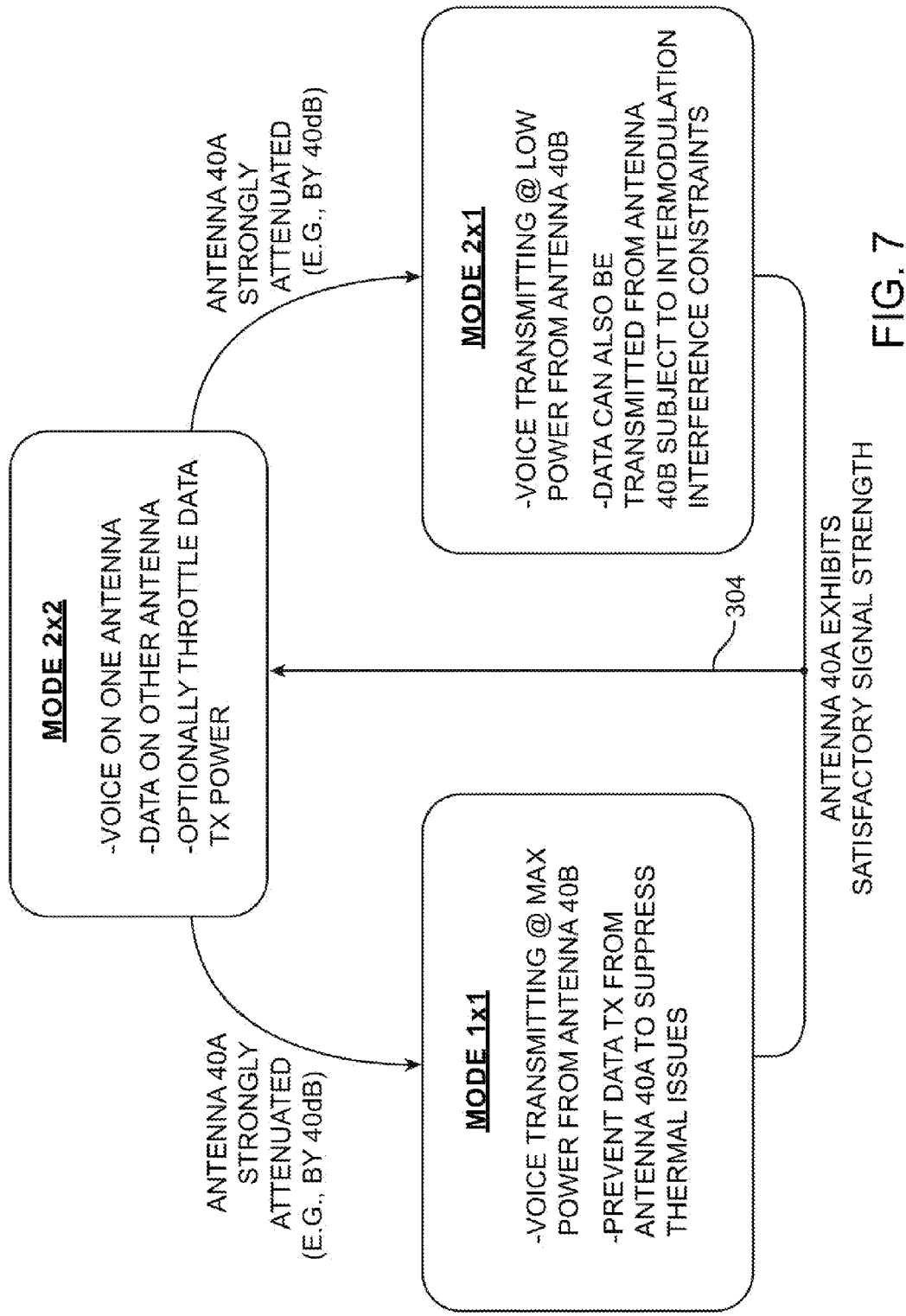
FIG. 7 is a diagram showing illustrative transmit modes in which a wireless electronic device may be operated in accordance with an embodiment of the present invention.

FIG. 7 is a state diagram showing different illustrative transmit modes in which device 10 may operate. In each of the modes of FIG. 7, assume that device 10 has to transmit voice traffic (e.g., device 10 is in a voice call). As shown in FIG. 7, device 10 may operate in first transmit mode 2×2. When operating in the first transmit mode, voice baseband processor 104 may be switchably coupled to a first of multiple antennas 40 in device 10, whereas data baseband processor 102 may be switchably coupled a second of multiple antennas 40 in device 10. If desired, voice baseband processor 104 may be coupled to the antenna that is currently exhibiting the highest wireless transmission performance. Data transmitter 106T may be optionally throttled in response to detecting undesired IMD3 interference (as an example).

If at least one of antennas 40 experiences high levels of signal attenuation (e.g., if signals received using antenna 40A is attenuated below nominal power levels by 40 dB), device 10 may be placed in either the second transmit mode (mode 1×1) or the third transmit mode (mode 2×1). In mode 1×1, voice transmitter 108T may be configured to transmit at maximum output power via antenna 40B while data transmitter 106T is throttled to suppress possible thermal noise or interference terms.

In mode 2×1, voice transmitter 108T may be configured to transmit at an output power level that is less than the maximum output power. Data transmitter 106T may optionally be transmitted using shared antenna 40B, as long as intermodulation distortion terms are kept under satisfactory levels.

Device 10 may continuously monitor the radio-frequency performance levels associated with antennas 40. In response to antenna 40A exceeding satisfactory performance criteria, device 10 may be placed in mode 2×2, as indicated by path 304. The modes of FIG. 7 assume that voice baseband processor 104 is currently generating active voice traffic that needs to be transmitted. During times when voice baseband processor 104 is idle (or in a sleep state), device may operating in a 1×1 mode in which data transmitter 106T transmits data traffic at maximum output power levels using any desired antenna (e.g., using the better antenna).

The three different transmit configurations shown in FIG. 7 are merely illustrative and do not serve to limit the scope of the present invention. If desired, device 10 may be operable in less than three transmit modes, more than three transmit modes, or may be operating in any suitable transmit mode that uses any desired number of physical antennas to transmit any number/types of wireless traffic signals.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for wirelessly transmitting signals in an electronic device having at least two baseband processor integrated circuits and at least two antennas, comprising:
   in a first mode of operation, wirelessly transmitting signals using only one of the baseband processor integrated circuits and one of the antennas;
   in a second mode of operation, wirelessly transmitting signals using both of the baseband processor integrated circuits and only one of the antennas; and
   in a third mode of operation, wirelessly transmitting signals using both of the baseband processor integrated circuits and both of the antennas.

2. The method defined in claim 1 further comprising:
   an applications processor integrated circuit that is coupled to both of the baseband processor integrated circuits.

3. The method defined in claim 1, wherein the baseband processor integrated circuits comprise cellular baseband processor integrated circuits operable to support respective cellular radio access technologies.

4. The method defined in claim 1, wherein the electronic device further includes switching circuitry, the method further comprising:
- during the first mode of operation, configuring the switching circuitry to couple one of the baseband processor integrated circuits to one of the antennas;
- during the second mode of operation, configuring the switching circuitry to couple both of the baseband processor integrated circuits to only one of the antennas; and
- during the third mode of operation, configuring the switching circuitry to couple both of the baseband processor integrated circuits to both of the antennas.

5. The method defined in claim 1 further comprising:
- during the third mode of operation, temporarily throttling one of the baseband processor integrated circuits in response to detecting excessive levels of intermodulation distortion.

6. The method defined in claim 1 further comprising:
- during the first mode of operation, transmitting signals using only one of the baseband processor integrated circuits via one of the antennas at maximum output power.

7. The method defined in claim 1 further comprising:
- in response to detecting that one of the two antennas experiences sufficiently high levels of signal attenuation, placing the device from the first mode of operation to one of the second and third modes of operation.

8. The method defined in claim 1, wherein the electronic device further includes a multiplexing circuit having first and second inputs, and wherein the multiplexing circuit is coupled between the two baseband processor integrated circuits and the two antennas, the method further comprising:
- during the first and third modes of operation, configuring the multiplexing circuit to route signals from its first input to its output.

9. The method defined in claim 8 further comprising:
- during the second mode of operation, configuring the multiplexing circuit to route signals from its second input to its output.

10. The method defined in claim 9, wherein the electronic device further includes a radio-frequency combiner, the method further comprising:
- with the radio-frequency combiner, receiving signals from the first and second baseband processor integrated circuits and providing a combined signal to the second input of the multiplexing circuit.

11. A method for transmitting radio-frequency signals in an electronic device having at least first and second baseband processor integrated circuits and at least first and second antennas, comprising:
- wirelessly transmitting signals generated by the first baseband processor integrated circuit using the first antenna in a first radio-frequency channel;
- wirelessly transmitting signals generated by the second baseband processor integrated circuit using the second antenna in a second radio-frequency channel; and
- monitoring noise signals in additional radio-frequency channels adjacent to the first and second radio-frequency channels.

12. The method defined in claim 11 wherein monitoring noise signals in the additional radio-frequency channels comprises monitoring noise signals in the additional radio-frequency channels adjacent to the first and second radio-frequency channels to measure intermodulation distortion signals due to wireless transmission of signals in the first and second radio-frequency channels.

13. The method defined in claim 12 further comprising:
- in response to detecting excessive amounts of intermodulation distortion signals, temporarily throttling the second baseband processor integrated circuit to prevent wireless transmission in the second radio-frequency channel.

14. The method defined in claim 12 further comprising:
- measuring antenna performance levels associated with the first and second antennas; and
- reconfiguring the electronic device to simultaneously transmit signals generated by the first baseband processor integrated circuit using the second antenna and to transmit signals generated by the second baseband processor integrated circuit using the first antenna based on the measured antenna performance levels.

15. The method defined in claim 12 further comprising:
- in response to detecting that a given one of the first and second antennas experiences sufficiently high levels of signal attenuation, switching the given antenna out of use while transmitting signals generated by at least one of the first and second baseband processor integrated circuits using the other antenna.

16. The method defined in claim 11, wherein the first baseband processor integrated circuit comprises a data baseband chip and the second baseband processor integrated circuit comprises a voice baseband chip, wherein the signals generated by the data baseband chip comprise packet switched data traffic and the signals generated by the voice baseband chip comprise circuit switched voice traffic.

17. A method for wirelessly transmitting signals in an electronic device having at least first and second baseband processor integrated circuits and at least first and second antennas, comprising:
- in a first mode of operation, wirelessly transmitting signals using both the first and second baseband processor integrated circuits and both of the antennas; and
- in response to detecting that the first antenna is receiving signals at a receive power level that is less than a predetermined threshold, placing the electronic device in a second mode of operation in which signals are transmitted using at least the first baseband processor integrated circuit and only the second antenna.

18. The method defined in claim 17 further comprising:
- in response to detecting that the first antenna is receiving signals at a receive power level that is less than the predetermined threshold, placing the electronic device in a third mode of operation in which signals are transmitted using both the first and second baseband processor integrated circuits and only the second antenna.

19. The method defined in claim 18 further comprising:
- during the second mode of operation, transmitting signals using only the first baseband processor integrated circuit via the second antenna at maximum output power.

20. The method defined in claim 19 further comprising:
- measuring antenna performance levels associated with the first and second antennas; and
- during the first mode of operation, coupling each of the first and second baseband processor integrated circuits to a respective one of the first and second antennas based on the measured antenna performance levels.

21. The method defined in claim 18 further comprising:
- during the first mode of operation, temporarily throttling one of the first and second baseband processor integrated circuits in response to detecting excessive levels of intermodulation distortion.

22. The method defined in claim 17, wherein the electronic device further comprises a multiplexing circuit having first and second inputs, and wherein the multiplexing circuit is coupled between the first and second baseband processor integrated circuits and the first and second antennas, the method further comprising:

during the first and second modes of operation, configuring the multiplexing circuit to route signals from its first input to its output.

\* \* \* \* \*